United States Patent [19]

Godshalk et al.

[11] 3,716,030
[45] Feb. 13, 1973

[54] ANIMAL OPERATED WATERING DEVICE

[75] Inventors: James B. Godshalk, Yardley; William P. Alburger, Hatfield, both of Pa.

[73] Assignee: Fox Products Co., Philadelphia, Pa.

[22] Filed: April 27, 1971

[21] Appl. No.: 137,987

Related U.S. Application Data

[63] Continuation of Ser. No. 883,474, Dec. 9, 1969, abandoned.

[52] U.S. Cl. ............................................... 119/72.5
[51] Int. Cl. ................................................ A01k 07/00
[58] Field of Search ........ 119/72.5, 75; 251/368, 339

[56] References Cited

UNITED STATES PATENTS

| 2,541,369 | 2/1951  | Kofford ........................... 119/72.5 |
| 2,073,112 | 3/1937  | Lindinger .................... 119/72.5 UX |
| 3,527,193 | 9/1970  | Smith ............................. 119/72.5 |
| 3,008,451 | 11/1961 | Curry ............................. 119/72.5 |
| 3,582,006 | 6/1971  | Thompson ...................... 119/72.5 |

*Primary Examiner*—Hugh R. Chamblee
*Attorney*—Roylance, Abrams, Berdo & Kaul

[57] ABSTRACT

A valve assembly including a generally tubular body means having a valve means positioned therein adapted to be actuated by an animal. The valve means includes a frusto-conical member engageable with a member providing a valve seat. Said member includes a lip elastically yieldable under forces applied by said valve means to stop the flow of liquid through the assembly.

10 Claims, 7 Drawing Figures

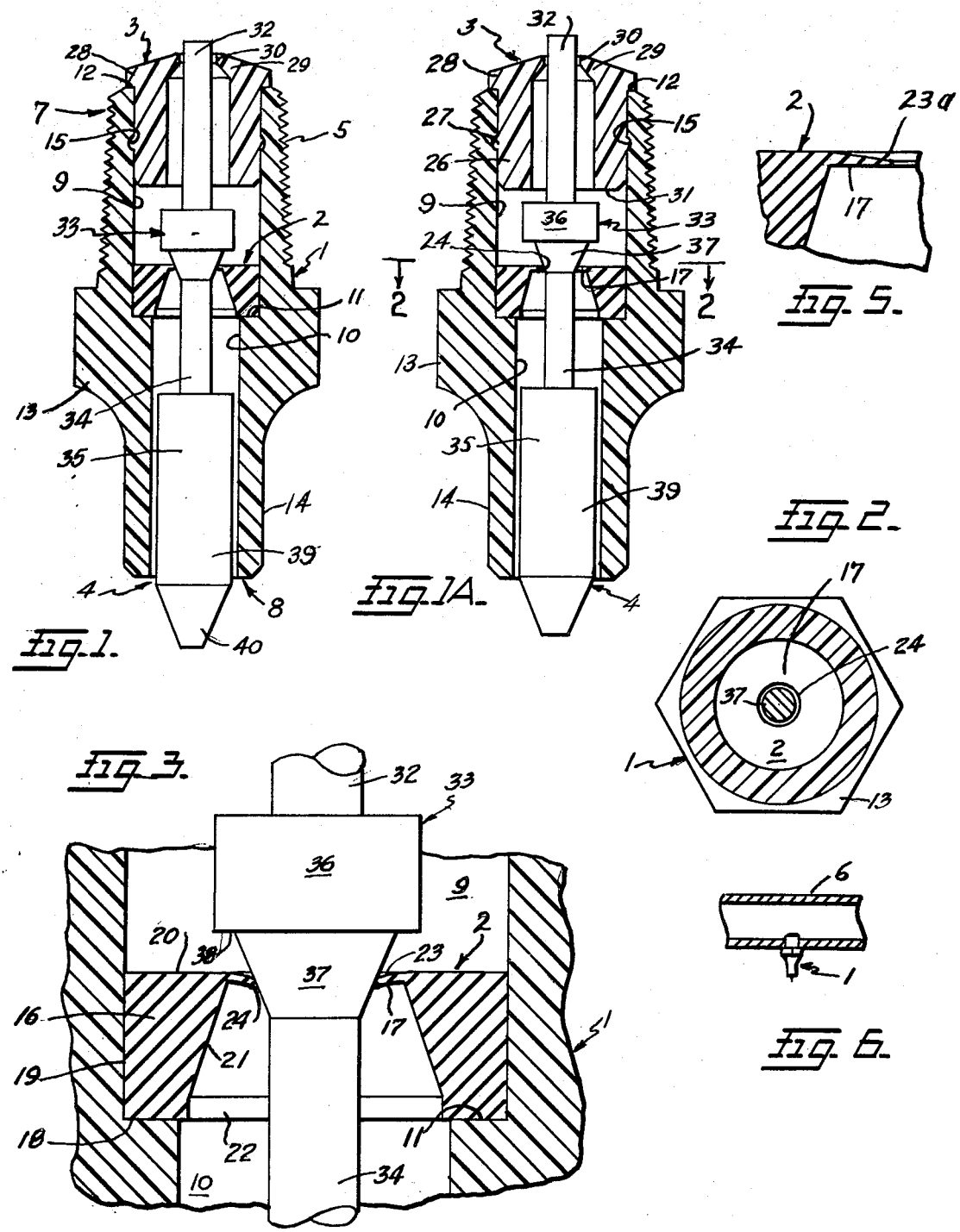

ANIMAL OPERATED WATERING DEVICE

This application is a continuation of application Ser. No. 883,474, filed Dec. 9, 1969, now abandoned.

This invention relates to animal operated watering devices and is specially useful for watering poultry.

Many poultry growers have long preferred to employ waterers of the general type employing a water supply member, usually a long conduit arranged generally horizontally, to which are attached a plurality of valves which can be operated by the birds to provide a small quantity of water whenever the bird pushes with its beak on the operating member of the valve. Commonly referred to as nipple valves, the valves for such waterers are quite small, typically on the order of 1 in. in maximum dimension, the small size being dictated by the inherent dimensional parameters of the watering system. Though prior-art workers have given much attention to such waterers, a number of problems, which stem particularly from the small size of the valve and the relatively low hydrostatic heads available in such systems, have seriously limited the success of such devices.

To be truly satisfactory, such waterers must be inexpensive, dependably operable by the birds to be watered, essentially free from tendencies to clog or stick as a result of foreign matter in the water, and capable of providing a relatively constant low "fully open" flow over a fairly wide range of hydrostatic head valves. Typically, such devices should exhibit a "fully open" flow of 2–5 oz. per min. over a range of hydrostatic head valves up to 6 ft. And the device must be easily operated, by the beak of the bird, to provide water, yet must close positively and dependably each time the bird withdraws its beak, such a closure depending upon hydrostatic forces aided by the small weight of the movable portions of the device. Since such weight is on the order of 1–2 grams, a typical diameter for a valve seat of such devices is less than 0.1 in., and the manufacturer's price for the valve should be less than $0.25, it will be recognized that the problems of satisfying the needs of poultry growers desiring to use such waterers are severe.

It is a general object of the invention to devise an animal operated waterer of the type described which can be manufactured at an acceptable cost, yet will be dependably operable in use.

Another object is to provide such a waterer that will operate over a wider range of hydrostatic supply heads than has heretofore been possible.

A further object is to devise waterers of the type referred to which are relatively free from the adverse effects of foreign matter in the water and which also are not subject to being clogged by particles of food, etc., which heretofore have been picked up by such devices from the beaks of the birds.

Yet another object is to provide such a waterer which is not likely to be damaged when a bird applies an excessive pulling or pushing force to the movable portion of the valve.

In general, the invention provides in such waterers a valve assembly in which only a single metal member constitutes the movable valve unit, and a special valve seat member and a restrictor member cooperate with the single metal member to provide the desired operating characteristics.

In order that the manner in which the foregoing and other objects are achieved according to the invention can be understood in detail, particularly advantageous embodiments thereof will be described with reference to the accompanying drawings, which form a part of the original disclosure of this application, and wherein:

FIGS. 1 and 1A are vertical sectional views of a waterer valve according to one embodiment of the invention, showing the valve assembly in closed and open conditions, respectively;

FIG. 2 is a transverse cross-sectional view taken generally on line 2—2, FIG. 1A;

FIG. 3 is an enlarged fragmentary vertical sectional view of a portion of the device of FIGS. 1 and 1A;

FIGS. 4 and 5 are fragmentary vertical sectional views illustrating valve seat members according to additional embodiments of the invention; and FIG. 6 is a fragmentary side elevational view illustrating the device of FIGS. 1 and 1A in combination with a water supply conduit as employed in a completed waterer.

FIGS. 1 and 1A illustrate a valve assembly according to one embodiment of the invention, and FIG. 6 illustrates the manner of incorporating such assembly in a poultry waterer. The valve assembly comprises a tubular body 1, formed as an integral member of molded or machined polymeric material. The stationary portion of the assembly also includes a valve seat member 2 and a restrictor member 3. A single integral metal member, indicated generally at 4, constitutes the movable valve member.

Body 1 is provided with exterior threads 5 so that the completed valve assembly can be secured in a threaded port in a water supply conduit 6, FIG. 6, in such fashion that body 1 is upright. The body can be considered as having an upper inlet end 7 and a lower outlet end 8. The upper portion of body 1 defines a right cylindrical chamber 9, while the lower portion defines a right cylindrical chamber 10 of smaller diameter, the two chambers being joined by a transverse annular upwardly facing shoulder 11. Body 1 has a transverse annular upper end face 12, an intermediate hexagonal enlargement 13 to aid in turning the body during insertion into the threaded port of conduit 6, and a smooth cylindrical outer surface 14 below enlargement 13. Near the top of the body, the wall of chamber 9 is interrupted by a transverse annular groove 15.

As best seen in FIG. 3, valve seat member 2 is an integral member of elastomeric material comprising an annular main body portion 16 and a transverse annular inwardly projecting lip 17. Body portion 16 has a flat lower face 18, engaged with shoulder 11, a cylindrical outer surface 19, embraced by the wall of chamber 9, a flat upper face 20, and an inner surface including downwardly and outwardly tapering frusto-conical portion 21 and a short right cylindrical lower end portion 22.

Lip 17 is located at the top of member 2 and is flat and of rectangular radial cross-section, the upper face 23 of the lip lying in the plane of face 20 when the lip is in relaxed, undistorted condition. As seen in FIG. 2, the inner periphery 24 of lip 17 defines a circular flow-accommodating opening concentric with the central axis of body 1. Member 2 is of resiliently deformable elastomeric material which has both a low water absorption characteristic and high resistance to compression and set. Typically, member 2 is of synthetic rubber or silicone rubber with a Durometer of about 25. The lip is of substantial radial extent, the radial width thereof being equal to at least 10 percent of the diameter of the opening defined by the lip. The thickness of the lip is small in comparison with its radial width. In a typical device, the root or outer diameter of the lip can be 0.112 in., the diameter of inner peripheral edge 24 can be 0.082 in. and the thickness of the lip can be 0.003 in. Under those conditions, lip 17 is resiliently yieldably under forces applied thereto in directions axially of body 1.

Restrictor member 3 is an integral member molded or machined from a polymeric material having low water absorption characteristics, high dimensional stability, and low friction characteristics. When injection molded, member 3 can typically be of acrylonitrile-butadiene-styrene copolymer. When machined, member 3 can typically be of polytetrafluoroethylene. Main body portion 26 of member 3 is in the form of a right cylindrical tube with a transverse annular outwardly projecting ridge 27, engaged in groove 15, and a transverse annular outwardly projecting shoulder portion 28, engaged over end face 12. Throughout most of the length of member 3, the inner surface thereof is right cylindrical. However, at its upper end, member 3 has a transverse annular inwardly projecting shoulder 29 presenting an axially short right cylindrical inner surface at 30. Lower end face 31 of body portion 26 lies at right angles to the central axis of body 1 and is spaced a substantial distance above valve seat member 2. The portion of chamber 9 between members 2 and 3 can be considered as the water inlet chamber.

The movable valve member 4 is machined from stainless steel and comprises an upper stem portion 32, a valve element portion indicated generally at 33, an intermediate stem portion 34, and a lower portion 35. Stem portions 32 and 34 are straight right cylindrical portions of the same diameter, this diameter being slightly less than that of surfaces 24 and 30, so that stem portions 32 and 34 can pass freely through members 3 and 2, respectively, leaving annular spaces for water flow when the valve is open. Valve element portion 33 includes an upper body 36 in the form of a right cylinder the diameter of which is significantly larger than the outer diameter of lip 17 and also significantly larger than the inner diameter of lower end face 31 of member 3. Body 36 of portion 33 is joined to intermediate stem portion 34 by a downwardly and inwardly tapering frusto-conical portion 37. The upper end of portion 37 is of smaller diameter than body 36 but of substantially larger diameter than the inner peripheral edge 24 of lip 17. The lower end of body 36 thus includes a transverse annular shoulder 38 which is normally spaced above upper face 20 of member 2. The axial length of frusto-conical portion 37 is larger in comparison with the thickness of lip 17. On the other hand, the combined axial length of body 36 and that portion of portion 37 which is between member 2 and body 36 when portion 37 is lightly engaged with lip 17 is small in comparison with the spacing between members 2 and 3, so that member 4 is free to move upwardly far enough to remove portion 37 completely from lip 17, opening the valve as seen in FIG. 1A.

Portion 35 is right cylindrical and of substantially larger diameter than the stem portions, the outer surface 39 of portion 35 being spaced slightly inwardly from the wall of outlet chamber 10. The lower tip 40 of portion 35 is frusto-conical, tapering downwardly and inwardly.

In use, the small weight of member 4 and the hydrostatic head applied via conduit 6 urge member 4 downwardly, frusto-conical portion 37 engaging inner edge 24 of lip 17 and resiliently deforming the lip downwardly in the fashion seen in FIG. 3, so that no water can flow from conduit 6 through body 1. Under these valve closed conditions, tip 40 of lower portion 35 of member 4 is located completely below the lower end of body 1. Also, as seen in FIG. 1, a portion of cylindrical surface 39 extends below the lower end of body 1 so that, in view of the small annular space between portion 35 and body 1, there is no opportunity for particles of food, etc., to enter and collect in the lower end of the body to create jamming conditions.

When a bird pushes on frusto-conical tip 40 with its beak, either directly upwardly or laterally in a camming relation with tip 40, member 40 is moved upwardly, typically to the position seen in FIG. 1A, so that frusto-conical portion 37 is lifted completely clear of lip 17 and the valve is therefore open. Under these conditions, water in conduit 6 flows through the restricted annular space between surface 30 of member 3 and stem portion 32, thence through chamber 9, around valve element portion 33, through the annular space between lip 17 and portion 37, into chamber 10, and outwardly through the space between portion 35 and the lower end of body 1. When the bird releases member 4, that member descends again to the valve closed position seen in FIGS. 1 and 3.

Each time the valve opens, lip 17 returns resiliently to the relaxed, undistorted position shown in FIG. 1A. Each time the valve closes, there is a wiping and sealing engagement between lip 17 and portion 37, with the lip applying a progressively increasing sealing pressure as it is further deformed. Under all conditions of operation, the restricted annular space between stem portion 32 and surface 30 of member 3 precludes entry of large particles, and the upward and downward movement of member 4 causes a periodic effective wiping action between stem 32 and surface to prevent the build up of slime or other accumulations which would interfere mechanically and hydraulically with operation of the device.

Should a bird push upwardly with excessive force, body 36 engages lower end face 31 of member 3 to stop member 4 before portion 35 can engage valve seat member 2, the length of stem portion 34 being large as compared to the space between body 36 and face 31. Should a bird pull downwardly on member 4 with excessive force, shoulder 38 is brought into engagement with the top face 20 of main body 16 of member 2, so that the valve seat member cannot be damaged and member 4 cannot be pulled through.

Member 3, in cooperation with stem portion 32, acts as a self-cleaning filter and also as a restrictor to limit water flow to a desired low level. In this connection, the radial width of the annular space between surface 30 and stem portion 32 is advantageously in the range of 0.004–0.02 in. Cooperating with body 36, member 3 also acts as a stop to limit upward movement of the movable valve member.

Lip 17 can have other configurations than that shown in FIG. 3, yet provide the wiping and sealing action characteristic of its thin pliable nature. Thus, as seen in FIG. 4, the lip is inwardly tapered at 17a, with both the upper and lower faces converging toward the central plane of the lip. As seen in FIG. 5, a similar tapering of the radial cross-section of the lip is accomplished by having the upper surfaces 23a slant downwardly and inwardly when the lip is in relaxed, undistorted condition.

Though threads 5 have been illustrated to secure body 1 in a port conduit 6, it will be understood that any suitable fastening means can be employed.

What is claimed is:

1. In an animal operated watering device, the combination of
   generally tubular body means having an inlet end and an outlet end and adapted to be secured in generally upright position to a hollow water supply member with said inlet end communicating with the interior of the water supply member,
   said body means defining an upper chamber of larger transverse dimension and a lower chamber of smaller transverse dimension with said chambers being joined by a transverse annular upwardly facing shoulder;
   an annular valve seat member disposed in said upper chamber and engaged with said shoulder,
   said annular valve seat member having a through passage, which is concentric with the longitudinal axis of said body means and which defines at the upper end of the through passage a circular opening of a diameter smaller than the transverse dimension of said lower chamber of said body means,
   said through passage being enlarged, below said circular opening, to a transverse dimension approximating that of said lower chamber;
   an annular restrictor member disposed in the upper end portion of said upper chamber and comprising
   a main body portion embraced by the upper end portion of said body means, and
   an inwardly projecting transverse annular portion having an axially short circular surface concentric with the longitudinal axis of said body means,
   said valve seat member and said restrictor member being spaced apart axially of said body means; and
   a unitary elongated metal movable valve member disposed in said body means and comprising
   an upper stem portion,
   a valve element portion,
   an intermediate stem portion, and
   a lower end portion;
   said upper and intermediate stem portions being of relatively smaller transverse dimension and extending respectively through said restrictor member and said valve seat member,
   there being only small clearances between said axially short circular surface of said restrictor member and said upper stem portion and between the wall of said circular opening of said valve seat member and said intermediate stem portion;
   said valve element portion being located between said restrictor member and said valve seat member in said upper chamber and having
   a main portion of larger transverse dimension than said opening defined by said valve seat member, and
   a downwardly and inwardly tapering frusto-conical surface adapted to engage said valve seat member in sealing relation;
   said lower end portion being of relatively larger transverse dimension such that the same is spaced only slightly from the wall of said lower chamber,
   the tip of said lower end portion being tapered, and
   the length of said lower end portion being such that said tapered tip is located substantially outside of said lower chamber for all operative positions of said valve member.

2. The combination defined in claim 1, wherein
the wall of said upper chamber is cylindrical,
the outer surfaces of said valve seat member and said restrictor member are cylindrical and engaged by the wall of said upper chamber, and
said restrictor member is an integral body of polymeric material,
   said inwardly projecting transverse annular portion of said restrictor member being located at said inlet end of said body means.

3. The combination defined in claim 1, wherein
said valve seat member is an integral body of elastomeric material having
   an outer annular body portion, and
   an inwardly projecting transverse annular lip defining said circular opening, the radial width of said lip being at least 10 percent of the diameter of said opening, and the thickness of said lip being small in comparison to said radial width, whereby said lip is elastically yieldable under forces applied to the inner peripheral portion of said lip by said frusto-conical surface of said valve element portion.

4. The combination defined in claim 3, wherein
said main portion of said valve element portion of said movable valve member includes a transverse annular downwardly facing shoulder disposed to engage said valve seat member and prevent excessive deformation of said lip when said movable valve member is pulled downwardly to an abnormal extent by an animal drinking from the waterer.

5. The combination defined in claim 3, wherein
said restrictor member and said main portion of said valve element portion of said movable valve member include cooperating stop surfaces disposed to be brought into mutual engagement when said movable valve member is forced upwardly,
   the relative length of said intermediate stem portion being sufficiently great that said lower end portion of said movable valve member is spaced below said valve seat member when said stop surfaces are in engagement.

6. The combination defined in claim 3, wherein said inlet and outlet chambers are cylindrical, the diameter of said inlet chamber is greater than that of said outlet chamber, and said chambers are joined by a transverse annular upwardly facing shoulder, said body portion of said valve seat member is generally cylindrical and seated on said shoulder, said lip being located at the top of said valve seat member.

7. The combination defined in claim 6, wherein said lip is flat when in relaxed condition, the upper surface of said lip being substantially coextensive with the upper end surface of said body portion.

8. The combination defined in claim 6, wherein the inner surface of said body portion of said valve seat member is generally frusto-conical and tapers downwardly and outwardly, the lower end of said inner surface having a diameter approximating that of the upper end of the wall of said outlet chamber.

9. The combination defined in claim 6, wherein said lip is of inwardly tapering radial cross section.

10. The combination defined in claim 3, wherein said restrictor member is an integral body of polymeric material and includes a tubular main portion embraced by the upper end portion of said body means, and an inwardly projecting transverse annular shoulder located at the upper end of said main portion and having an axially short cylindrical surface surrounding and spaced slightly outwardly from said upper stem portion of said movable valve member.

* * * * *